United States Patent Office 3,681,025
Patented Aug. 1, 1972

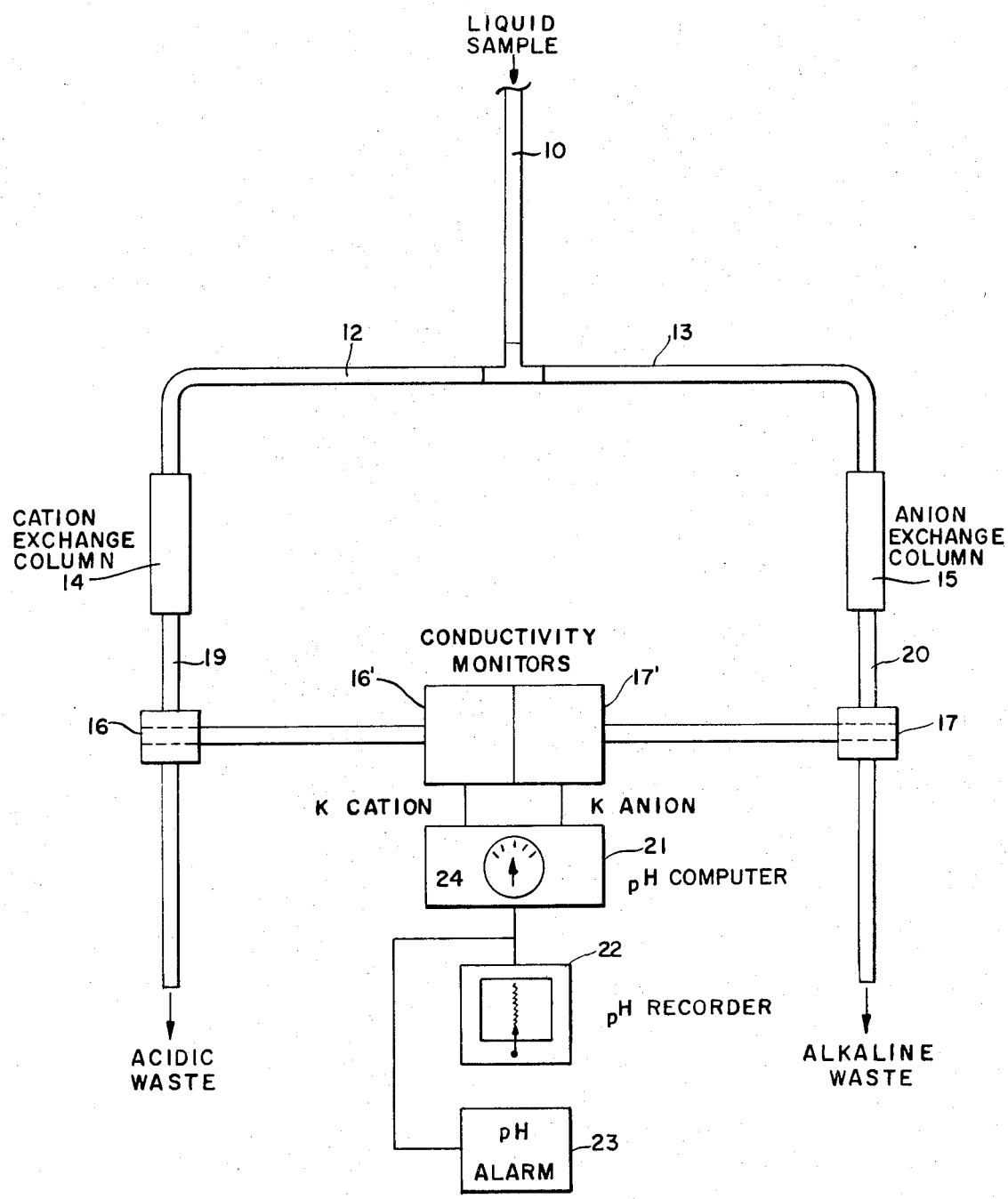

3,681,025
METHOD AND SYSTEM TO MONITOR pH VALUES IN WATER
Svend B. Dalgaard, 101 Gedney St., Apt. 6G, Nyack, N.Y. 10960
Filed Aug. 19, 1970, Ser. No. 65,004
Int. Cl. B01j *1/04;* G01n *27/26, 33/18*
U.S. Cl. 23—230 R    6 Claims

ABSTRACT OF THE DISCLOSURE

A method and system for monitoring the pH value in a continuously flowing liquid sample. The method comprising splitting a continuously flowing sample stream into two streams, passing one stream through a cation exchange resin column, and passing the other stream through an anion exchange resin column, measuring the specific electrical conductivity of the cation exchange resin column effluent, measuring the specific electrical conductivity of the anion exchange resin column effluent, and obtaining the pH value of the sample by solving the equation $$pH = 7 - \log \frac{Kcat}{1.65\ Kan}$$

where Kcat is the specific conductivity in ohms$^{-1}$ cm.$^2$ of the cation exchange resin effluent, and Kan is the specific conductivity in ohms$^{-1}$ cm.$^2$ of the anion exchange resin effluent. The system comprises a conduit for conducting the liquid sample, means for splitting the sample into two streams and conducting one stream through a cation exchange resin column and for conducting the other stream through an anion exchange resin column, specific conductivity cells for measuring the specific conductivity of the effluent from each exchange resin column and elctrical means for solving the equation $$pH = 7 - \log \frac{Kcat}{1.65\ Kan}$$

and indicating the pH value of the liquid sample.

This invention relates to an improved method and system for monitoring pH values in water.

BACKGROUND

In modern power plants, whether nuclear or fossil, water of high purity is applied universally. The specific conductance of the feedwater is normally less than 0.1 micro-ohm, centimeter$^{-1}$ at 25° C. and that of the boiler water is often 0.2 to 0.5 micro-ohm, cm.$^{-1}$. In these power plants it is virtually impossible to properly monitor the pH value of the various coolants with the monitoring methods and devices existing prior to this invention. The monitoring difficulties encountered are the result of a number of factors which are primarily the low concentration of electrolyte in the water, the formation of streaming potentials associated with the electrodes of a monitoring device, static potentials forming around the monitoring potentiometer, backward flow of feed water through the capillary in calomel electrodes, and the susceptibility of glass electrodes to be scratched and therefore to give incorrect readings.

However, if some acids or alkali should inadvertently enter the reactor or boiler waters (for example, from spent regenerants from mixed beds) damage would almost certainly occur within hours or minutes unless the plant is placed in a cold shutdown condition for cleanup. The cost of damage and of lost power production during a shutdown would be very high. It is therefore an object of this invention to provide an improved pH monitoring method and system which is applicable to any high purity stream of water in power plants or elsewhere and which is primarily intended to monitor relatively small pH deviations from the neutral, i.e. pH=7, where the conventional pH meters do not work well.

Other objects, advantages and capabilities of the present invention will be apparent from the following detailed description, taken in conjunction with the accompanying drawing which shows a flow diagram of the pH monitoring system of this invention.

The flow diagram shown in the drawing illustrates the pH monitoring system in accordance with the invention. Starting at the top of the sheet a liquid sample of unknown pH value flows through a conduit 10 until it reaches a stream splitting joint connected to branch conduits 12 and 13 where the flow of the liquid sample is split into two streams, one stream going through conduit 12 into a cation exchange column 14 and the other stream going through conduit 13 into an anion exchange column 15. The cation exchange column 14 is packed with cation exchange material selected from cation exchange materials available commercially and the anion exchange column 15 is packed with anion exchange materials also selected from anion exchange materials available commercially. In passing through the cation exchange column 14 the sample stream from conduit 12 exchanges cations for hydrogen, and in passing through the anion exchange column 15 the sample stream from conduit 13 exchanges anions for hydroxyl ions. Thus, the effluent from the cation exchange column 14 will contain primarily hydrochloric 15 the sample stream from conduit 13 exchanges anions for hydroxyl ions. Thus, the effluent from the cation exchange column 14 will contain primarily hydrochloric and sulfuric acid and the effluent from the anion exchange column 15 will contain primarily sodium, potassium, and ammonium hydroxides. Positioned in the conduits 19 and 20 leading from the cation and anion exchange columns 14 and 15 respectively are conductivity cells 16 and 17 of conventional type including a pair of spaced electrodes immersed in the liquid flowing in the conduits 19 and 20. The electrodes in the conductivity cells 16 and 17 are connected to conductivity monitors 16' and 17' respectively which produce voltage outputs corresponding to the conductivity, Kcat, of the cation exchange column effluent, and to the conductivity, Kan, of the anion exchange column effluent. The conductivity cells 16 and 17 are preferably of the platinized, platinum conductivity cell type while the conductivity monitors 16' and 17' are selected from conventional types including solubridges, balanced bridges or other suitable electrical devices capable of registering the resistance between the pair of electrodes immersed in the effluent streams. The effluents from the conductivity cells 16 and 17 may be discharged as acidic and alkaline wastes respectively.

A primary feature of the invention is my derivation of the mathematical relationship between the pH of the sample and the conductivities of the effluents from the cation and anion exchange resin columns 14 and 15 respectively, which relationship is expressed by the equation:

$$pH = 7 - \log \frac{Kcat}{1.65\ Kan}$$

where Kcat is the conductivity of the cation exchange resin effluent and Kan is the conductivity of the anion exchange resin effluent.

By providing a pH monitor 21 which is capable of electrically solving the equation $$pH = 7 - \log \frac{Kcat}{1.65\ Kan}$$

and applying the voltage outputs from the conductivity monitors 16' and 17' as inputs to the pH monitor, a continuous computation of the pH value of the sample can be made. A voltage output from the pH monitor 21 corresponding to the computed pH value of the sample may be read directly from an indicator meter 24 calibrated in pH values, or the pH monitor output may be applied to a pH strip recorder 22, an alarm 23 or to other devices which utilize the pH monitor output for useful purposes.

The system of this invention can be adapted to utilize the pH monitor output to control chemical feed units for adjusting the pH of water being used for various purposes. It can also be used to detect excessive conductivities of feed and boiler water, e.g. condenser tube failures, in which both Kcat and Kan would have larger values indicating high dissolved solids content.

The proportion of flow of the liquid sample in the conduits 12 and 13 is not critical but will usually be approximately equal.

The continuously flowing sample obtained from any desired source is preferably heated or cooled as required to a constant temperature in the range of 10° C. to 40° C. where the platinum electrodes in the conductivity cells 16 and 17 have the longest practicable life. 25° C. is the preferred temperature.

While the invention has been described as particularly suited to monitor pH of high purity streams of water, it is by no means so limited and can be used to monitor pH of very impure water which may be high in acid or alkaline content. Also the method and system described herein is not limited to industrial applications, however it is particularly well adapted for industrial uses.

What is claimed is:

1. A method for monitoring the pH value in a liquid sample comprising splitting the sample into two portions, passing one portion through an anion exchange resin, passing the other portion through a cation exchange resin, measuring the specific conductivity of each portion after the portions have passed through the respective exchange resins, applying the measured conductivity values Kcat and Kan into the equation $$pH = 7 - \log \frac{Kcat}{1.65\ Kan}$$

where Kcat is the specific conductivity in $ohms^{-1}\ cm.^2$ of the cation exchange resin effluent and Kan is the specific conductivity in $ohms^{-1}\ cm.^2$ of the anion exchange resin effluent, and solving the equation.

2. The method set forth in claim 1 wherein said liquid sample is water.

3. The method set forth in claim 1 including the preliminary step of heating or cooling the liquid sample to maintain the temperature of the liquid sample within the range of 10° C. to 40° C.

4. A system for monitoring the pH value in a continuously flowing liquid sample comprising means for splitting the liquid sample into two streams, an anion exchange resin column, a cation exchange resin column, means passing one stream through the anion exchange resin column, means passing the other stream through the cation exchange resin column, electrical monitoring means for measuring the electrical specific conductivities of the effluents from the cation exchange resin column and from the anion exchange resin column, and computing means for solving the equation $$pH = 7 - \log \frac{Kcat}{1.65\ Kan}$$

where Kcat is the specific conductivity in $ohms^{-1}\ cm.^2$ of the cation exchange resin column effluent and Kan is the specific conductivity in $ohms^{-1}\ cm.^2$ of the anion exchange resin column.

5. The system set forth in claim 4 together with a recorder for continuously recording the computed pH value from said computing means.

6. A method for continuously monitoring the pH value in a continuously flowing liquid sample comprising the steps of splitting the sample into two streams, passing one stream through an anion exchange resin, passing the other stream through a cation exchange resin, measuring the specific conductivity of each stream after the streams have passed through the respective exchange resins, applying the measured conductivity values Kcat and Kan as voltage inputs into an electrical computer which solves the equation $$pH = 7 - \log \frac{Kcat}{1.65\ Kan}$$

where Kcat is the specific conductivity in $ohms^{-1}\ cm.^2$ of the cation exchange resin effluent and Kan is the specific conductivity in $ohms^{-1}\ cm.^2$ of the anion exchange resin effluent.

References Cited

UNITED STATES PATENTS 2,711,995   6/1955   Sard _____ 210—25

FOREIGN PATENTS 486,676   9/1952   Canada _____ 210—25

MORRIS O. WOLK, Primary Examiner

R. M. REESE, Assistant Examiner

U.S. Cl. X.R.

23—230 A, 253 R, 253 A; 210—25